United States Patent [19]

Gazuit

[11] 4,232,723
[45] Nov. 11, 1980

[54] ISOSTABLE TUBULAR TIRE

[75] Inventor: Georges Gazuit, Montlucon, France

[73] Assignee: The Goodyear Tire & Rubber Company, Akron, Ohio

[21] Appl. No.: 949,449

[22] Filed: Oct. 10, 1978

[51] Int. Cl.³ ............................ B60C 5/12; B60C 9/20
[52] U.S. Cl. ................................ 152/350; 152/352 R; 152/353 C; 152/354 R; 152/361 FP; 156/121; 156/128 N; 156/133
[58] Field of Search ................... 152/330 R, 350, 352, 152/353 R, 353 C, 354 R, 361 R, 361 FP

[56] References Cited

U.S. PATENT DOCUMENTS

| | | | |
|---|---|---|---|
| 1,217,665 | 2/1917 | Thropp | 152/330 R |
| 1,441,965 | 1/1923 | Cato | 152/350 |
| 2,950,751 | 8/1960 | Bolster et al. | 152/330 R |
| 3,606,921 | 9/1971 | Grawey | 152/354 |
| 3,708,007 | 1/1973 | Roberts | 152/361 FP |
| 3,757,844 | 9/1973 | Verdier | 152/361 FP |
| 3,831,657 | 8/1974 | Dillenschneider | 152/361 FP |
| 3,861,440 | 1/1975 | Ochiai et al. | 152/361 R |
| 3,910,336 | 10/1975 | Boileau | 152/379 |
| 3,938,575 | 2/1976 | Boileau | 152/362 R |
| 4,076,066 | 2/1978 | Verdier | 152/353 R |

FOREIGN PATENT DOCUMENTS

| | | |
|---|---|---|
| 658718 | 5/1965 | Belgium ............... 152/330 R |
| 888653 | 7/1953 | Fed. Rep. of Germany ........... 152/330 |
| 2229790 | 1/1974 | Fed. Rep. of Germany .... 152/361 FP |
| 671324 | 9/1929 | France . |
| 1174970 | 11/1958 | France . |
| 1391143 | 12/1965 | France . |
| 2052882 | 3/1971 | France . |
| 2052885 | 3/1971 | France . |
| 2317111 | 6/1976 | France . |
| 2348066 | 1/1978 | France . |
| 68167 | 8/1972 | Luxembourg . |
| 102826 | 10/1962 | Netherlands ....................... 152/361 FP |

OTHER PUBLICATIONS

Rubber Chemistry Technology Akron, 1963 (R. B. Day & S. D. Gehamn, "Theory for the Meridian Section of Inflated Cord Tires", pp. 11–27).

*Primary Examiner*—John E. Kittle
*Attorney, Agent, or Firm*—J. A. Rozmajzl

[57] ABSTRACT

Tubular tire for motor vehicles, of the type including an inflatable tubular inner (pneumatic) tube, a bracing, a case of the radial type, a rim strip, some rubber sides, a tire tread and two semi-rigid circular rods. The two rods 7 are set at the level of the bracing 2 at the edges thereof; the rim strip 4 has a width included between approximately 0.25 L and approximately 0.35 L; the transverse section of the tire has an H/L ratio included between approximately 0.5 and approximately 0.6; the sides 5 of the tire have a profile corresponding to that of the top part of the curve which represents the equation of a classic radial tire; the aggregate is such that, seen in transverse section, the tire fairly forms an isostable tri-angulated system.

15 Claims, 18 Drawing Figures

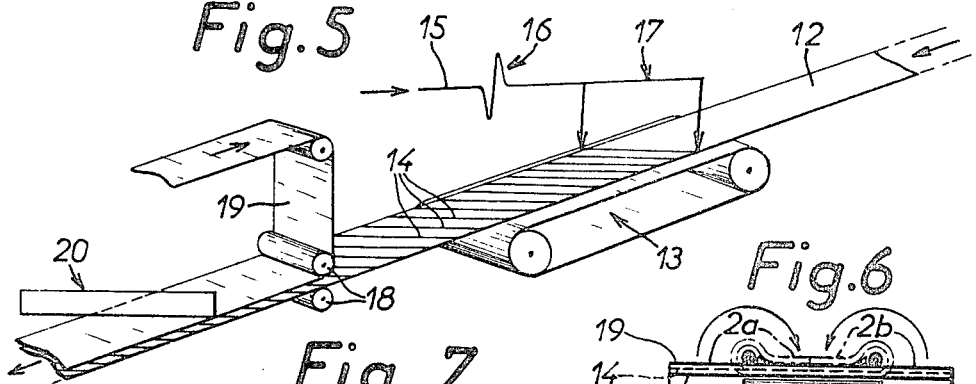

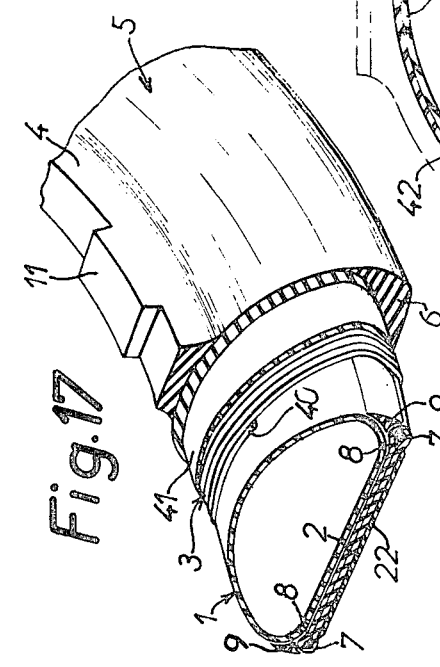

ISOSTABLE TUBULAR TIRE

The present invention concerns a tubular tire for motor vehicles, of the type which is comprised of an inflatable tubular inner pneumatic tube, of a bracing, of a case of the radial type, of a rim strip, of rubber tire sides, of a tire tread and of two semi-rigid circular rods.

Theoretically, for the most usual shapes of tires, the most rational utilization of the traction properties of the cables which form the carcass of the tire requires that the threads of the carcass be put into position in the radial planes of the tire. However, in the event that a tire is made subject to a transverse strain (moment of roll), there occurs a deformation of the radial threads in the portion of the tire which is in contact with the ground. Such moment of roll is accompanied by a by-effect of moment of swaying on the threads which are in contact with the ground, and the angular distortion which results therefrom gives rise to a loss of lateral stability under the normal rolling conditions.

In order to remedy such serious defect, the tire manufacturers have been led to incline the radial threads by a certain angle on either side of the circumferential direction of the tire, in such a way as to establish a geodetic force field (bias fabric tires commonly known as conventional tires). Whenever a conventional tire is made subject to a moment of roll under a transverse strain, the moment of swaying which is derived from the moment of roll is absorbed by the moment of the forces created by the slant strain in the bias fabric (horizontal component). The geodetic construction system has therefore a self-stability effect on a roll effect of the tire given rise to by a transverse strain. However, such a geodetic construction does also present a drawback. In fact, the distortion of the diamond formed by the bias fabric in the track area on the ground creates some sliding between the plies, wherefrom there result a heating and a sliding of the tire on the road, which does substantially increase the wearing out of the tire.

Such drawbacks are partially eliminated with the coming into being of the braced tire, commonly known as "radial carcass tire" or, by abbreviation, "radial tire". Such radial tire takes up the rational utilization of the radial threads for the carcass, and the deformation of the radial threads in the track area on the ground under the effect of a transverse strain is prevented by a bracing which cannot be deformed. Under the effect of a roll movement, the sides of the tire alone sustain a moment of swaying. Theoretically, the rigid bracing which is incorporated in the tire tread does not sustain any angular deformation. The behaviour of the tire, in transverse stability, therefore solely depends on the precision of the development on the road of the rigid bracing which is incorporated in the tire tread, and this being up to a limit value of the moment of swaying on the sides, which is related to the grip of the tire tread on the road. Beyond such limit value, the tire tread suddenly loses its grip. This explains the well known poor transverse stability of the radial tires. In addition, the radial tires have another well known drawback, which is the heating of their sides. In fact, under a vertical strain (collapsing effect of the tire), each side is made subject to a buckling action which is characterized by a sudden variation of the curve radius of the side mainly in two critical areas which are respectively situated in the vicinity of the tire bead and in the vicinity of the area of the linking between the side and the tire tread. Such sudden variations in the curve radius result, as a consequence of a repeated folding action, in an important heating of such two critical areas. Under a transverse strain, an analogous heating is given rise to in the critical area of the linking between each side and the tire tread. Such heating actions may give rise to a loosening of the bead in the critical area of the tire bead and to a loosening of the tire tread in the critical area of the linking between the sides and the tire tread. The absorbing effect of a radial tire therefore systematically gives rise to some heating, in particular in the two critical areas of each side which have been indicated hereinabove, one of which may have some serious consequences on the resistance of the tire.

In spite of the defects which have been recalled hereinabove (transverse stability defect and heating in the two critical areas) and in spite of a construction difficulty which is more considerable than that of a conventional tire, the radial tires have compelled recognition on the market since a few years.

Besides the quite classic tires which have been recalled hereinabove, (conventional tires and radial tires), there exist also some tires which are known as "tubular" or "tubeless" tires. Such tubular tires are derived from the first tires which had been invented in the beginning of the century. The inner pneumatic tube or tubes, with a circular or oval-shaped section, is or are reinforced with bias or radial threads, either by means of a one-thread winding, or by means of a wrapper made of a sewn fabric. Such tubular tires offer a certain number of advantages:

1. Incorporated inner pneumatic tube, and therefore a system known as "tubeless".
2. In certain tubular tires, dowing away with the rods as components of the strength of the tire.
3. Balanced fields of forces in the carcass of the tire.

Some tubular tires of such kind are described, for instance, in the French Pat. No. 2,052,885, and in the patent application in France filed under No. 76.10980, on the fourteenth day of April 1976, now French Pat. No. 2,348,066 in the name of Georges Gazuit and entitled "Isostable tubular tire and its manufacturing process". The tires which are described in both such documents present the same defects as the radial tires where the heating of their sides is concerned (each side has also two critical areas). Where the radial carcass tubular tire is concerned, such as it is described in the French Pat. No. 2,052,882, there even occurs an aggravation of the transverse stability defect in relation to the classic radial tire. In fact, such increased transverse stability defect results from the fact that, seen in its radial section, the section of the tire is liable to roll over on itself under the action of the transverse strain. Conversely, the tire which is described in the patent application filed in France under No. 76.10980 and indicated hereinabove, presents a transverse stability which has been improved in relation to the tubular tire of the French Pat. No. 2,052,885 and to the classic radial tire, but such improvement of the transverse stability is obtained to the prejudice of the absorption and at the cost of an important heating of the elastic binding material between the inner pneumatic tubes.

In fact, the ideal tire must therefore have the following characteristics:

1. A large flexibility in the vertical direction (absorption of the vertical strains to which the tire is made subject).

2. A large rigidity or stability in the transverse direction in order to sustain the transverse strains.

3. A minimum internal heating (carcass with preferentially radial threads; no critical heating area of the sides).

4. A minimum manufacturing cost (maximum mechanized industrialization, minimum investments, minimum power consumption for the production of the tire).

The purpose of the present invention is therefore to provide an isostable tubular tire of the type indicated hereinabove, which meets the four characteristics mentioned above.

For such purpose, the tubular tire according to the present invention is characterized by the fact that the two rods are set at the level of the bracing at the edges thereof, by the fact that the rim strip is of a width included between approximately 0.25L and approximately 0.35L, wherein L represents the total width of the tire tread, and by the fact that the transverse section of the tire has an H/L ratio which is included between approximately 0.5 and approximately 0.6, wherein H represents the total height between the rim strip and the tire tread, the aggregate being such that the tire, when seen in transverse section, fairly constitutes an isostable triangulated system.

On account of such a construction and on account of a particular shape of the sides of the tire, which will be described further on, the tubular tire according to the present invention has a large flexibility or pliability in the vertical direction and a large rigidity in the transverse direction, there is no critical heating area and it may be manufactured in a very economic manner.

There will be given now a description of various forms of realization of the tubular tire according to the present invention by making reference to the drawings which are attached as schedules hereto in which:

FIG. 5 is a perspective schematic view illustrating a stage of the manufacture of the bracing of the tubular tire according to the invention.

FIG. 6 illustrates a later stage of the manufacture of the bracing.

FIG. 7 is a partial view of the completed bracing manufactured such as shown in FIGS. 5 and 6.

FIG. 8 is a partial view showing an alternative realization of the bracing shown in FIG. 7.

FIG. 9 is a partial view in flat development of the bracing, showing the setting of the threads inside the bracing after turning down or folding of the marginal parts around the two rods.

FIG. 10 is a schematic view illustrating the manufacture of the radial case and of the rim strip.

FIGS. 11, 12, 13 and 14 are some schematic views illustrating the manner according to which the elements which form the tubular tire according to the invention are assembled.

FIG. 15 is a partial view showing the injection phase of the tire tread and the vulcanization phase of the tire.

FIG. 16 is a view similar to FIG. 1, showing a tubular tire according to a second form of realization of the present invention.

FIG. 17 is a partial perspective and sectional view, showing a tubular tire according to a third form of realization of the present invention.

FIG. 18 is a partial transverse section view of a tubular tire according to a fourth form of realization of the present invention.

Figure 1:
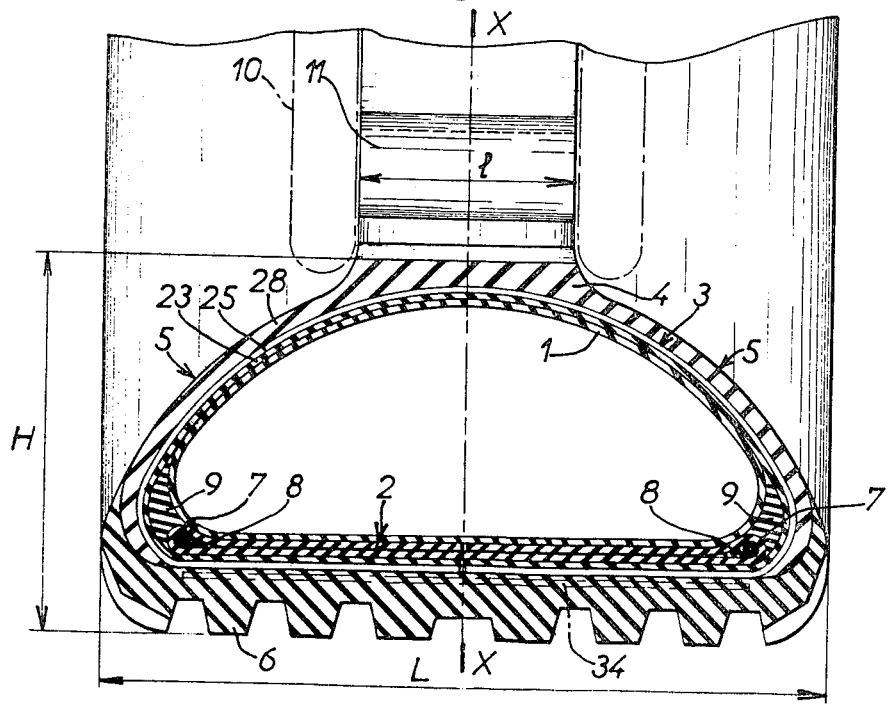
FIG. 1 is a partial view, in transverse section, of a tubular tire in accordance with an initial form of realization of the present invention.

The tubular tire which is represented in FIG. 1 essentially includes an inflatable tubular inner (pneumatic) tube 1, a rigid bracing 2, a case 3 of the radial type, a rim strip 4, some side gums 5, a tire tread 6 and two semi-rigid circular rods 7.

According to the present invention, the two rods 7 are set at the level of the bracing 2 at the edges thereof. The rim strip 4 has a width 1 included between approximately 0.25L and approximately 0.35L, wherein L represents the total width of the tire tread 6. The transverse section of the tire has an H/L ratio included between approximately 0.5 and approximately 0.6, wherein H represents the total height between the rim strip 4 and the tire tread 6.

Preferentially, the sides 5 of the tire have a profile corresponding to that of the top part of the curve defined by the following equation:

$$x = \int_y^a \frac{y^2 - b^2}{V\sqrt{(a^2 - b^2)^2 - (y^2 - b^2)^2}} \cdot dy$$

Figure 2:
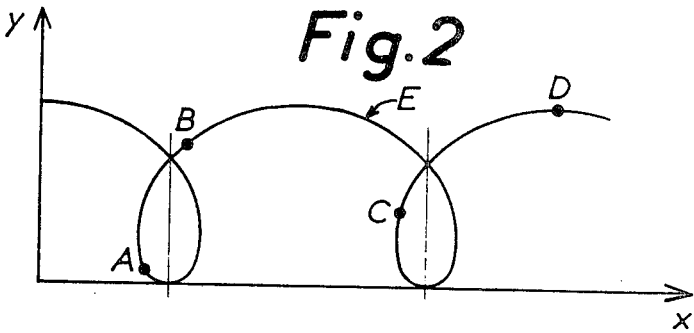
FIG. 2 is a graph showing the representative curve of the balance equation of a classic radial tire, and showing more particularly the portions of such curve which are taken in order respectively to determine the shape of the sides of a classic radial tire and the shape of a tubular tire according to the present invention.

Such equation represents the well known balance equation of a classic radial tire. The meaning of the various parameters of such equation and the calculations in connection with such equation are given, in particular in the magazine entitled "Tyre Science and Technology TSTCA", vol. 1, No. 3 of August 1973, pages 290 to 315. The curve E which represents such equation is represented in FIG. 2. More specifically, the left side 5 (seen in FIG. 1) has a profile corresponding to the profile of arc CD of the curve E of FIG. 2. The point C is a point which is close to or identical to the point of curve E whereat the tangent to such curve is fairly vertical. The point D is a point which is close to or identical to the top of curve E, whereat the tangent to such curve is fairly horizontal. Of course, the right side 5 of the tire has a profile which is symmetrical to that of the left side in relation to the transverse median plane XX (FIG. 1) of the tire. In order to make a comparison, the left side of a classic radial tire has a profile corresponding to that of arc AB of curve E of FIG. 2.

Preferentially, such as it is shown in FIG. 1, the two rods 7 are respectively anchored at the ends of bracing 2, in such a way as to give to the said bracing a large rigidity in its plane (seen in FIG. 1) and in such a way as to define two fixed points. The radial case 3 completely surrounds the aggregate constituted by the inner (pneumatic) tube 1 and by the bracing 2 with the rods 7, rubber apexes 8 and 9 being provided in a manner known in itself in order to fill up the gaps. The rubber sides 5 are hooked, on the one hand, to the ends of the bracing 2, and, on the other hand, to the rim strip 4. The rim strip may be realized in a rubber harder than the sides 5, in such a way as to constitute a rigid element hooked to the rim 10 (shown in mixed dots in FIG. 1) of the wheel of the motor vehicle. The rim 10 may be realized in a manner known in itself in two axially detachable parts each one of which is provided with an edge, the rim strip 4 being pinched or maintained without any possibility of an axial movement, between the two edges of the rim 10. Although the internal peripheral surface of the rim strip 4 could be smooth, it is preferentially provided, in a manner which is known in itself, with the protruding parts 11 which are circumferentially spaced and forming grooves allowing for a positive hooking of the tire on the rim 10 which, in such a case, is grooved in a manner corresponding thereto. Instead of having some grooves, the internal peripheral surface of the rim strip 4 could be formed, in a manner known in itself, by two truncated cone shaped surfaces set in such a way that the internal volume which they mark out presents the shape of a dolly, in a manner analogous to that which is represented in FIG. 7 of the French patent application No. 76.10980 which has been mentioned hereinabove.

Figure 3:
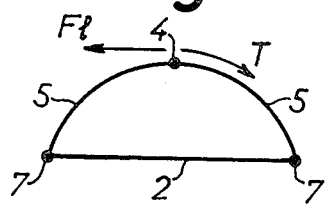
FIGS. 3 and 4 are schematic views which allow for illustrating the reasons on account of which the tubular tire according to the invention has a good stability in the transverse direction and a good pliability in the vertical direction, without creating any critical heating area in the sides of the tire.

With the construction of the tubular tire which has been described hereinabove, there is obtained, seen in transverse section, an isostable triangulated system, the three heads of which are formed by the three points which the two rods 7 and the rigid rim strip 4 do constitute. On account of such a transverse triangulation, there is obtained a tire having an excellent flexibility in the vertical direction and a very good stability in the transverse plane, such as this will be explained now by means of making reference to FIGS. 3 and 4. It will be assumed that the two points 7 are fixed in relation to the ground and that the point 4 is movable. Such as there is shown in FIG. 3, whenever the tire is made subject to a lateral strain F1, the reaction T which results therefrom inside the side 5 opposite to the direction of the strain Fl opposes the lateral moving of point 4. There results therefrom a lateral move of such point 4 of a very minor value as compared to the value of the lateral move which would occur with a classic radial tire. In addition, in the course of such minor lateral move, the sides 5 are strained, not by buckling in the same way as in a classic radial tire, but by flexion with no or very little angular distortion at the level of the points 7. There results therefrom, therefore, no heating or very little heating at the level of the rods 7 and, as a consequence of the foregoing, there is no risk of a loosening of the tire tread 6.

Figure 4:
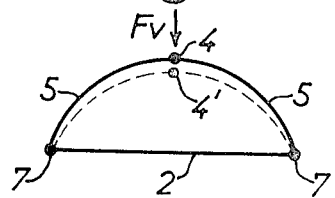

In the same way, whenever the tire is made subject to a vertical strain Fv (collapse) such as there is shown in FIG. 4, the point 4 plunges down to 4' by means of the flexion of the sides 5, and not by buckling such as it occurs in a classic radial tire. The points 7 being deemed to be fixed, there is no angular distortion of the sides 5 at the level of such two points and, as a consequence of the foregoing, no heating.

Such an enclosure shape ensures therefore a good absorption in the vertical direction and a good rigidity in the transverse direction, and it does give rise to clearly less heating than in the case of a tire having a classic shape, in particular in the critical areas of the hooking of the bracing. In addition, on account of the high degree of rigidity of the bracing 2 due to the special setting of the rods 7, the tire according to the present invention has an excellent stability on the ground.

The bracing 2 may be produced in any conventional manner starting from a textile or metal, rubber and woven fabric twilled slantwise.

However, there will now be described a preferred form of realization of the bracing 2 by making reference to FIGS. from 5 through 9. Such as there is shown in FIG. 5, a first rubber fabric 12, produced by a conventional slubbing machine which is not shown, is brought on the top ply of an endless belt 13 in order to receive thereon some segments of threads 14. The segments of threads 14 are produced from a continuous thread 15, made of steel or of glass fiber, unrolled from a spool which is not shown and rubberized by means of a conventional rubber extruding machine. The properly rubberized thread 15 is provisionally stored in a loop 16, from which it is carried to a feeding device 17, for example of the barrel type, in which the thread 15 is cut into segments 14 of a suitable length, which are pinched at a pre-determined angle in relation to the longitudinal axis of the rubber fabric 12. Preferentially, such angle is included between 17 degrees and 20 degrees. The segments 14 having thus been cut and pinched are distributed with such same angle and with a spacing pitch which has been pre-determined by the feeding device 17 on the rubber fabric 12. The rubber fabric 12 having thus been covered up by the segments of threads 14 is thereafter conveyed between some pressing rollers 18, between which a second rubber fabric 19 is made to pass also, in such a way that the segments of thread 14 be sandwiched between the two fabrics 12 and 19. The fabric 19 has the same width as the fabric 12 and it is also manufactured by means of a conventional slubbing machine. The aggregate thus obtained at the outlet of the two pressing rollers 18 is thereafter cut according to a pre-determined length, corresponding to the length of the circumference of the tire which is to be produced, by means of a cutting device 20. Up to this stage of the manufacture of the bracing, the operations which have been described hereinabove are well known. There will be noted, however, that for the purpose of the realization of the bracing according to the present invention, the two rubber fabrics 12 and 19 must have a width which must exceed the distance which lies between the two rods 7, such distance being preferentially approximately equal to 0.85 time the width L of the tire tread. Such as it will be seen hereinafter the novelty in the process of the manufacture of the bracing of the tire according to the invention resides in the fact that the marginal parts of the aggregate formed by the two fabrics 12 and 19 and by the threads 14 are folded up around the two rods 7.

After having been cut according to the appropriate length by the cutting device 20, the aggregate formed by the two fabrics 12 and 19 and by the threads 14 is wound on a drum 21 such as shown in FIG. 6. The rubber of apex 8 and the rods 7 are thereafter placed on the drum 21, as shown in FIG. 6, with a pre-determined spacing between them, for example at a distance of 0.85 L from each other, then the marginal parts 2a and 2b of the aggregate 12, 14, 19 are folded back by 180 degrees around the rods 7 towards the transverse median plane of the drum 21, which is also the transverse medium plane XX of the tire. Such as shown in FIG. 7, a binding rubber fabric 22 may be placed, should this be required, around the bracing 2 thus obtained, in order firmly to bind between them the folded back marginal parts 2a and 2b and in order to prevent them from drawing apart from each other when, being put into service, they are subject to a traction in the lateral direction. In the form of realization which has been described hereinabove, the folded back marginal parts 2a and 2b are radially situated on the ourside in relation to the central part 2c of the aggregate formed by the two fabrics 12 and 19 and by the threads 14. According to an alternative realization, the marginal parts 2a and 2b may be folded back around the rods 7 in such a way that, after their folding back, they are radially situated on the inside in relation to the central part 2c, such as shown in FIG. 8. Under such conditions, it is possible to do without the binding strip 22 of FIG. 7 because, in such a case, after they have been put into service, the marginal parts 2a and 2b are not the ones which are made subject to a traction strain, but it is the central part 2c, and there does not therefore exist any risk to have the marginal parts 2a and 2b being drawn apart from each other.

FIG. 9 shows the pattern of the segments of thread 14 after the folding of the marginal parts 2a and 2b around the two rods 7, the bracing 2 being presumably developed flat.

There will now be described the manner according to which the radial case 3 of the tire represented in FIG. 1 can be realized. As shown in FIG. 10, a rubber fabric 23 (please refer also to FIG. 1), produced by a conventional slubbing machine, is led on the top ply of a conveyor belt 24 in order to receive some rubberized thread segments 25, made of metal or of glass fiber. The thread segments 25 can be obtained in the same manner as the thread segments 14 of the bracing 2, and they can be distributed with a pre-determined spacing pitch on the rubber fabric 23 by means of a feeding device 26, for example a feeding device of the barrel type analogous to the feeding device 17 of FIG. 5. However, in such a case, the thread segments 25 are placed by the feeding device 26 in a transverse direction in relation to the longitudinal axis of the fabric 23, that is to say with an angle of 90 degrees in relation to the said axis. The fabric 23 coated by the thread segments 25 is thereafter carried between two pressing rollers 27, between which another rubber fabric 28 is also made to pass, in such a way that the thread segments 25 be sandwiched between the two fabrics 23 and 28. The fabric 28 can also be produced by means of a conventional slubbing machine.

Should it be so desired, the rim strip 4 can also be formed at such manufacturing stage. For such purpose, a rubber band 29, the width of which corresponds to that of the rim strip 4, is extruded by means of a conventional slubbing machine (which is not shown) and it is made to pass between two pressing cylinders (which are not shown), one of which is grooved in such a way as to form on such band 29 some salients corresponding to the grooves 11 of the rim strip 4. The band 29 is realized from a rubber which contains a percentage of sulphur not so large than that of the fabrics 23 and 28, in such a way as to have, after it has been vulcanized, a larger hardness than that of the said fabrics 23 and 28. Such as shown in FIG. 10, the band 29 is thereafter made to pass at one and the same time as the aggregate formed by the two fabrics 23 and 28 and by the threads 25 between two pressing rollers 30, one of which is grooved, in order to fix such band 29 on the fabric 28 according to the longitudinal median axis of such fabric. The aggregate obtained at the outlet of the two pressing rollers 30 is thereafter carried to a cutting device 31 suitable for cutting such aggregate into sections having an appropriate length depending on the dimensions of the tire which is to be realized.

There will be now described how the components of the tire which have been described hereinabove, can be assembled by making reference to FIGS. 11 through 14. Each one of the aggregates 23, 25, 28, 29, cut according to the length suited to the cutting device 31 of FIG. 10, is wound over the periphery of a drum 32 having a suitable diameter, such as shown in FIG. 11, and the ends of the said aggregate are connected between them in a conventional manner. The inner (pneumatic) tube 1 with its inflating valve 33 is thereafter placed such as shown in FIG. 12, and inflated at a low pressure. The bracing 2 and the rubbers of apex 9 are thereafter placed on the periphery of the inner (pneumatic) tube 1, such as shown in FIG. 13. Lastly, the marginal parts of the aggregate formed by the two fabrics 23 and 28 and by the threads 25, are folded down around the aggregate formed by the inner (pneumatic) tube 1, the rubbers of apex 9 and the bracing 2, by means of a conventional winding operation such as shown in FIG. 14. The width of the fabric 23 and the length of the thread segments 25, which is fairly equal to the width of the fabric 23, are chosen in such a way that, after the winding operation which is shown in FIG. 4, the marginal parts of the fabric 23 and the ends of the threads 25 which form the case 3 are meeting in the transverse median plane of the tire on the outside of the bracing 2, in such a way as completely to wrap the aggregate for med by the inner (pneumatic) tube 1, the bracing 2 and the two rods 7. Conversely, such as this is visible, in particular, in FIG. 11, the fabric 28 may have a width which is less than that of the fabric 23. However, the fabric 28 must have a width which is sufficient in order that its marginal parts, which are situated on either part of the band 29 forming the rim strip 4 and which are respectively intended for forming the rubber of the sides 5 of the tire, be hooked on at the level of the ends of the bracing 2 after having performed the winding operation which is shown in FIG. 14. Of course, the fabric 28 could have the same width as the fabric 23. The width of the fabric 23 and the length of the threads 25 may be chosen, for example, in such a way that the marginal parts of the fabric 23 and the ends of the threads 25 respectively meet close alongside each other and end to end in the transverse median plane of the tire. In such a case, the marginal parts of the fabric 23 and the ends of the thread segments 25 may be directly bound between them by the tire tread 6 such as it is shown in FIG. 1. However, in order to reinforce the binding between the marginal parts of the fabric 23 and between the ends of the threads 25 (and, as the case may be, between the marginal parts of the fabric 28) and in order better to resist the lateral traction strains in operation, one may find it advantageous to provide for a binding rubber fabric or, better, for a second bracing 34. In the event that a rubber binding or a bracing 34 has been provided, this may be installed on the aggregate obtained after the winding operation which is shown in FIG. 14, in such a way that the marginal parts of fabric 23, the ends of the segments of threads 25 and, as the case may be, the marginal parts of the fabric 28 be sandwiched between the bracing 2 and the connecting band or the bracing 34. The bracing 34 may be a conventional bracing in rubberized fabric, whether textile or or metal, woven with slantwise twilled threads, according to a different angle of the threads 14 and of the bracing 2.

As an alternate process, the width of the fabric 23, the length of the thread segments 25 and, as the case may be, the width of the fabric 28, may be chosen in such a way that, after the winding operations which are shown in FIG. 14, the said marginal parts of the fabric 23 (and, as the case may be, of the fabric 28) and the ends of the thread segements 25 overlap over all or part of the width of the bracing 2.

The aggregate obtained after the rolling operations which are shown in FIG. 14, as the case may be provided with a connecting band or with a bracing 34, is thereafter placed in a heating mould 35 (FIG. 15), to which there are associated a rubber extrusion device 36 and a transfer device 37 for the purpose of the injection of the tire tread 5. The mould 35 also serves for the vulcanization of the tire. The parts of the wall of the internal cavity of the mould which correspond to the sides 5 of the tire are shaped in such a way as to give to the sides 5 a profile corresponding to that of arc CD of the curve E such as it is represented in FIG. 2.

In the statements made hereinabove, it has been supposed that the rim strip 4 of the tire was formed at one and the same time as the radial case 3, such as this had been explained hereinabove with respect to the FIG. 10. However, the rim strip 4 can also be formed by injection at one and the same time as the tire tread 6 in the mould 35. In such a case, the mould 35 will include at least one other injection orifice 38 (shown with mixed dots in FIG. 15) for the purpose of the injection of the rubber which is intended for forming the rim strip 4.

On the other hand, there has been supposed in the foregoing statements, that the aggregate formed by the inner (pneumatic) tube 1, by the apex rubbers 9 and by the bracing 2 with the rods 7, was wrapped in the rubber fabrics 23 and 28 and in the radial thread segments 25 in such a way that the marginal parts of such two fabrics 23 and 28 and the ends of the threads 25 do meet in the symmetrical transverse median plane XX of the tire at the outside of the bracing 2. However, the two fabrics 23 and 28, without the band 29 forming the rim strip, and the thread segments 25 can also wrap the aggregate constituted by the inner (pheumatic) tube 1, by the apex rubbers 9 and by the bracing 2 with the rods 7, in such a way that the marginal parts of the fabrics 23 and 28 do meet in the symmetrical transverse median plane of the tire at the level of the rim strip 4, such as this is shown in FIG. 16. In the same way as before, the marginal parts of the fabrics 23 and 28 and the ends of the threads 25 may respectively meet close alongside to each other and end to end and be connected between themselves either directly by the rim strip 4 applied or injected in situ, or by means of a rubber binder or of another bracing 39 such as this is shown in FIG. 16, the rim strip 4 being applied or injected in situ after the laying of the binding band or of the bracing 39. In the event that a bracing 39 is made use of, such bracing may be constituted in a conventional manner by a rubberized fabric, whether textile or metal, the threads of which are woven slantwise twilled.

The FIG. 17 shows another form of realization of the tire according to the present invention, and more especially, another possible way of realizing the radial case 3. In the FIG. 17, the radial case 3 is realized by means of the winding of a single rubberized thread 40, whether made of metal or of glass fiber, in such a manner that the coils formed by the winding be fairly situated in some radial planes of the tire. It is already known, in the tubular tires, that an inner (pneumatic) tube can be reinforced by means of the winding of a rubberized thread. However, in this instance, the particularity of the winding resides in the fact that the radial coils formed by the thread 40 surround not only the inner (pneumatic) tube 1, but also the bracing 2 with the rods 7 and the apex rubbers 9. Such as it is shown in FIG. 17, a binding rubber 41 is also placed around the thread coils 40. The laying of the side rubbers 5 may be effected by means of some winding operations, in a manner analogous to that which is represented in FIG. 14.

The FIG. 18 shows, in part, another form of realization of the tubular tire according to the present invention. In the form of realization which is represented in FIG. 18, the bracing 2 is not folded back around the rods 7, but the rods 7 are anchored in the edges, folded back towards the inside, of a rubber fabric 42 which partially surrounds the inner (pneumatic) tube 1 with the exception of its part which is adjacent to the tire tread 16. The bracing 2, which may, for example, be constituted by a rubberized fabric, whether textile or metal, woven slantwise twilled, with an angle of about 17 to 20 degrees, is applied to the part of the inner (pneumatic) tube 1 which is adjacent to the tire tread 6, and the edges of the bracing 2 overlap at the outside the folded back edges of the fabric 42. The radial case 3, the rubber sides 5 and the rim strip 4 can be realized, for example, as described with respect to FIG. 10, and they may be placed around the aggregate formed by the inner (pneumatic) tube 1, by the bracing 2 and by the rubber fabric 42 with the rods 7, by some winding operations analogous to those which are shown in FIG. 14. In the same way, the injection of the tire tread 6 and the vulcanization of the tire can be effected in a manner which is analogous to that shown in FIG. 15.

Before starting on a description of the general manufacturing process of the tubular tire according to the present invention, there will be briefly recalled that the manufacture of a classic radial tire does not follow any continuous process, but that it goes through a succession of transformation operations: mixing of the rubbers; preparation of the fabrics and calendering; extrusion of the rubber folds; cutting; preparation of the rods; fabrication of the tire; vulcanization. All such operations are carried out, in a general way, in some independent workshops, wherefrom there result some handling operations at least as numerous as the transformation operations, and a storing problem for the components between the various manufacturing stages, which storing requires more room than the transformation operations themselves. In addition, to the extent that the same elements are heated and cooled on several occasions, throughout the operations of preparation of a tire, there exists a very large wastage of power. Lastly, although the operations which have been indicated hereinabove have been mechanized to a considerable extent, the manufacturing of the classic radial tires nonetheless requires a comparatively important labor. For all such reasons, it will easily be understood that the manufacturing process of a classic radial tire is costly.

Conversely, the manufacture of the tubular tire according to the present invention may be concentrated in one single workshop and realized according to a continuous process in three phases, a first phase for the preparation of the components of the construction of the tire, a second phase for the assembling of the elements of the structure, and a third phase for the vulcanization of the structure. The first phase includes three parts which can take place at one and the same time:

(a) preparation of the carcasses, for example by means of following the manufacturing line represented in FIG. 10.

(b) preparation of the inner (pneumatic) tubes made of butyl rubber, by means of a quite classic manufacturing line of inner (pneumatic) tubes, which can be, as the case may be, independent of the general manufacturing line.

(c) preparation of the bracings with the laying of the rods, for example, by means of following the line represented in FIGS. 5 and 6. The rods, made either of glass fiber, or of metallic cables, can be realized in accordance with the classic process.

The second phase (assembling of the structure), may be carried out very simply by means of an assembly line of the revolving type including four stands:

(a) a first stand to which the manufacturing line of the carcasses is leading (FIG. 10) and the manufacturing line of the inner (pneumatic) tubes also arrives, and at which the operations which are illustrated in FIGS. 11 and 12.

(b) a second stand which is connected by a transfer device to the manufacturing line of the bracings (FIGS. 5 and 6) and at which there is carried out the operation of laying of the bracing which is illustrated in FIG. 13.

(c) a third stand at which the winding operations which are illustrated in FIG. 14 are carried out.

(d) a fourth stand or removal stand, from which the structure thus assembled is transferred to an injection and vulcanization line, in which there is proceeded to the third phase which is indicated hereinabove (FIG. 15).

The injection and vulcanization line can also be of the revolving type with several moulding cavities.

Such a manufacturing process allow for numerous savings in relation to the manufacturing process of a classic radial tire. In particular, it allows for the following:

(a) A saving on the labor.

(b) A saving on the floor-space, to the extent that it does away with 100% of the inter-phase storing of the manufacturing process of a classic radial tire.

(c) A saving in the handling to the extent that it does away with about 90% of the inter-phase handling operations of the manufacturing process of a classic radial tire.

(d) A substantial saving in heating power, since the structural elements are only heated on one occasion at the start and since they arrive into the moulding cavity for the injection and the vulcanization, at a temperature which is still in the vicinity of 50 to 60 degrees. On account of the fact that the injection of rubber into the mould for the purpose of the formation of the tire tread may be carried out at a temperature which may be approximately equal to or higher than 120 degrees, the average temperature of the tire in the mould before the vulcanication, is therefore in the vicinity of 90 degrees (in the manufacturing process of a classic radial tire, the carcass which is introduced in the vulcanization mould is cold). There results therefrom on such account a power gain and a gain on the vulcanization time.

The tubular tire according to the present invention may be realized in all the classic tire dimensions for passenger cars as well as for heavy-duty vehicles. It is even possible to realize some duplex tires for heavy duty vehicles, that is to say twin tires. In such latter instance, the two twin tires may have a radial case common to both tires and their tire treads may be injected both at the same time.

It is clearly understood that the forms of realization of the tubular tire according to the present invention which have been described hereinabove, have been given as purely indicative examples and in no way limiting, and that numerous modifications can be brought without departing from the scope of the present invention.

I claim:

1. A tubular tire for motor vehicles of the type including an inflatable inner tube, a casing of the radial type, a reinforcement in addition to the casing in the ground contacting area, a rim strip, some rubber sides, a tire tread and two semi-rigid circular rods set at the level of the reinforcement at the edges thereof characterized by the fact that the rim strip has a width included between approximately 0.25 L and approximately 0.35 L, wherein L represents the total width of the tire tread, by the fact that the transverse section of the tire has in a known manner an H over L ratio which is included between 0.5 and 0.6 wherein H represents the total height between the rim strip and the tire tread, and by the fact that seen in transverse section each side of the tire has a profile corresponding to a curve described by the equation:

$$x = \int_y^a \frac{y^2 - b^2}{\sqrt{(a^2 - b^2)^2 - (y^2 - b^2)^2}} \cdot dy$$

which is substantially included between two points wherein the tangents are respectively vertical at y approximately equal to b and horizontal at y approximately equal to a, said approximately horizontal point of tangency corresponding substantially with the intersection of the tire vertical section centerline and the rim and said vertical point of tangency corresponding substantially with the outermost maximum cross-section width of the tire, the aggregate being such that the tire when seen in transverse section forms an isostable system.

2. A tire according to claim 1, characterized by the fact that the internal peripheral surface of the rim strip 4 is provided, in a manner known in itself, with protruding parts 11, circumferentially spaced and forming some grooves allowing for the hooking of the tire on a rim 10, which is grooved in a manner corresponding thereto, of a wheel.

3. A tire according to claim 1, characterized by the fact that the internal peripheral surface of the rim strip 4 is constituted, in a manner known in itseld, by two truncated cone shaped surfaces which are set in such a way that the internal volume which they mark out presents the form of a dolly.

4. A tire according to claim 1, characterized by the fact that the rods 7 are anchored in the edges of the bracing 2.

5. A tire according to claim 4, characterized by the fact that the bracing 2 is constituted, in a manner which is known in itself, by an aggregate of two rubber fabrics 12 and 19, between which some rubberized threads 14, made of glass fiber or of metal, are placed slantwise with a pre-determined spacing pitch, by the fact that the said aggregate 12, 14 and 19, has a width which is larger than the distance between the rods 7, and by the fact that the marginal parts 2a and 2b of the said aggregate 12, 14, 19 are folded back in a known manner by 180 degrees towards the symmetrical transverse median place XX of the tire around the two rods 7.

6. A tire according to claim 5, characterized by the fact that the rubberized threads 14 are set with an angle of about 17 degrees to 20 degrees in relation to the longitudinal axis of the fabrics 12 and 19.

7. A tire according to claim 1 characterized by the fact that the radial case 3 is formed by an aggregate of two rubber fabrics 23 and 28, which are respectively internal and external, cut according to a pre-determined length, between which some rubberized threads 25, made of glass fiber or of metal, are set transversely in relation to the longitudinal axis of the two fabrics 23 and 28 with a pre-determined spacing pitch, and by the fact that the said aggregate 23, 25, 28 which forms the radial case 3 is set in such a way as to wrap the aggregate formed by the inner (pneumatic) tube 1, the bracing 2 and the two rods 7.

8. A tire according to claim 7, characterized by the fact that the marginal parts of the said aggregate 23, 25, 28, which form the radial case 3 do meet in the transverse median place XX of the tire and at the outside of the bracing 2.

9. A tire according to claim 8, characterized by the fact that the marginal parts of the said aggregate 23, 25, 28 forming the radial case 3 are connected between them by the wire tread 6.

10. A tire according to claim 8, characterized by the fact that the marginal parts of the said aggregate 23, 25, 28 forming the radial case 3 are connected between them by a binding rubber fabric or by a second rubberized bracing 34 which is woven with twilled threads, around which the tire tread 6 is set.

11. A tire according to claim 8, characterized by the fact that the marginal parts of the said aggregate 23, 25, 28 forming the radial case 3 overlap over all or part of the width of the bracing 2.

12. A tire according to claim 8 characterized by the fact that the rim strip 4 is fastened in the midst of the external rubber fabric 28 of the said aggregate 23, 25, 28, which forms the radial case 3, and by the fact that the rubber sides 5 are constituted by the parts of the said external rubber fabric 28 which are situated on either side of the rim strip 4.

13. A tire according to claim 7, characterized by the fact that the marginal parts of the said aggregate 23, 25, 28, which forms the radial case 3 do meet in a known way in the transverse median plane XX of the tire at the level of the rim strip 4.

14. A tire according to claim 1, characterized by the fact that the radial case 3 is constituted, in a manner which is known in itself, by a single rubberized thread 40 which is wound in such a manner that the coils formed by the winding be fairly in some radial planes, and by the fact that the radial case 3 surrounds the aggregate formed by the inner (pneumatic) tube 1, the bracing 2 and the two rods 7.

15. A tire according to claim 1, characterized by the fact that the rods 7 are anchored in the folded back edges of a rubber fabric 42 partially surrounding the inner (pneumatic) tube 1 with the exception of its part which is adjacent to the tire tread 5, by the fact that the bracing 2 is applied to the part of the inner (pneumatic) tube 1 which is adjacent to the tire tread 6, the edges of the bracing 2 externally overlapping the folded back edges of the said fabric 42, and by the fact that the radial case 3 surrounds the aggregate formed by the inner (pneumatic) tube 1, the bracing 2 and the said fabric 42 with the rods 7.

* * * * *

UNITED STATES PATENT AND TRADEMARK OFFICE
CERTIFICATE OF CORRECTION

PATENT NO. : 4,232,723                 Page 1 of 2

DATED : November 11, 1980

INVENTOR(S) : Georges Gazuit

It is certified that error appears in the above-identified patent and that said Letters Patent are hereby corrected as shown below:

line 2 of the abstract, substitute --reinforcement-- for "bracing".

col 1, lines 6, 47, 50, and 54, substitute --reinforcement-- for "bracing".

col 3, lines 15, 53, 56, 57, 60, 62, and 63, substitute --reinforcement-- for "bracing"

col 4, lines 16, 20, 57, 58, 62 and 66, substitute --reinforcement-- for "bracing".

col 5, lines 63 and 66, substitute --reinforcement-- for "bracing".

col 6, lines 2, 35, 38, 44 and 62, substitute --reinforcement-- for "bracing".

col 7, lines 17 and 27, substitute --reinforcement-- for "bracing".

col 8, lines 10, 16, 24, 26, 34, 52, 53, 59, 60 and 63, substitute --reinforcement-- for "bracing".

col 9, lines 3, 6, 29, 34, 37, 48, 51 and 68, substitute --reinforcement-- for "bracing".

col 10, lines 9, 14, 19 and 24, substitute --reinforcement-- for "bracing".

continued

UNITED STATES PATENT AND TRADEMARK OFFICE
CERTIFICATE OF CORRECTION

PATENT NO. : 4,232,723
DATED : November 11, 1980
INVENTOR(S) : Georges Gazuit

It is certified that error appears in the above-identified patent and that said Letters Patent are hereby corrected as shown below:

col 11, lines 4, 18 and 20, substitute --reinforcement-- for "bracing".
Claim 4, line 52, substitute --reinforcement-- for "bracing".
Claim 5, line 54, substitute --reinforcement-- for "bracing".
Claim 7, line 11, substitute --reinforcement-- for "bracing".
Claim 8, line 17, substitute --reinforcement-- for "bracing".
Claim 10, line 26, substitute --reinforcement-- for "bracing".
Claim 11, line 31, substitute --reinforcement-- for "bracing".
Claim 14, line 20, substitute --reinforcement-- for "bracing".
Claim 15, lines 26 and 28, substitute --reinforcement-- for "bracing".

Signed and Sealed this

Thirteenth Day of March 1984

[SEAL]

Attest:

GERALD J. MOSSINGHOFF

Attesting Officer          Commissioner of Patents and Trademarks